United States Patent [19]

Dahl et al.

[11] 3,925,307

[45] Dec. 9, 1975

[54] ANTIOXIDANTS FOR POLYARYLETHER KETONES

[75] Inventors: Klaus Joachim Dahl, Palo Alto; Floyd Masato Kameda, Mt. View, both of Calif.

[73] Assignee: Raychem Corporation, Menlo Park, Calif.

[22] Filed: Apr. 23, 1973

[21] Appl. No.: 353,422

[52] U.S. Cl.... 260/45.75 R; 260/45.7 R; 260/45.75
[51] Int. Cl.² ......................................... C08G 67/00
[58] Field of Search .......... 260/45.7 R, 47 R, 47 C, 260/45.75, 37 R

[56] References Cited
UNITED STATES PATENTS

| | | | |
|---|---|---|---|
| 3,065,205 | 11/1962 | Bonner | 260/47 |
| 3,134,753 | 5/1964 | Kwiatek | 260/47;47 R |
| 3,324,199 | 6/1967 | Tocker | 260/47 |
| 3,442,857 | 5/1969 | Thornton | 260/47 |
| 3,455,736 | 7/1969 | Davis | 260/37 R |
| 3,616,200 | 10/1971 | Reibach | 260/45.75 |
| 3,632,546 | 1/1972 | Haung et al. | 260/45.7 |
| 3,668,057 | 6/1972 | Agolini et al. | 260/63 |

*Primary Examiner*—V. P. Hoke
*Attorney, Agent, or Firm*—Lyon & Lyon

[57] ABSTRACT

Incorporation into polyarylether ketones of a metal oxide selected from the group of amphoteric metal oxides consisting of the oxides of aluminum, beryllium, bismuth, cadmium, cerium, gallium, germanium, lanthanum, lead, manganese, tin, titanium, zinc, zirconium, uranium and mixtures thereof significantly enhances the oxidation resistance of said polyarylether ketones.

9 Claims, No Drawings

ANTIOXIDANTS FOR POLYARYLETHER KETONES

BACKGROUND OF THE INVENTION

The use of stabilizers to prevent or reduce the oxidation of virtually all of the polymers in current commercial use is of course well known. However, polymers are being developed which melt and are thermally stable at very high temperatures. During processing and in use such polymers are subjected to increasingly severe conditions in terms of both time and temperature in an oxidative environment. Such severe conditions result in most known oxidation stabilizers being of at best limited effectiveness in inhibiting thermally induced oxidation. There is, therefore, a pressing need to develop additives which will enable polymers having a high melting point and good high temperature thermal stability in an inert atmosphere to be utilized under service conditions of high temperature and an oxidative atmosphere. Among the most thermally stable of the more recently developed thermoplastic polymers are those known as polyarylether ketones and in particular those polyarylether ketones comprising the following recurring units.

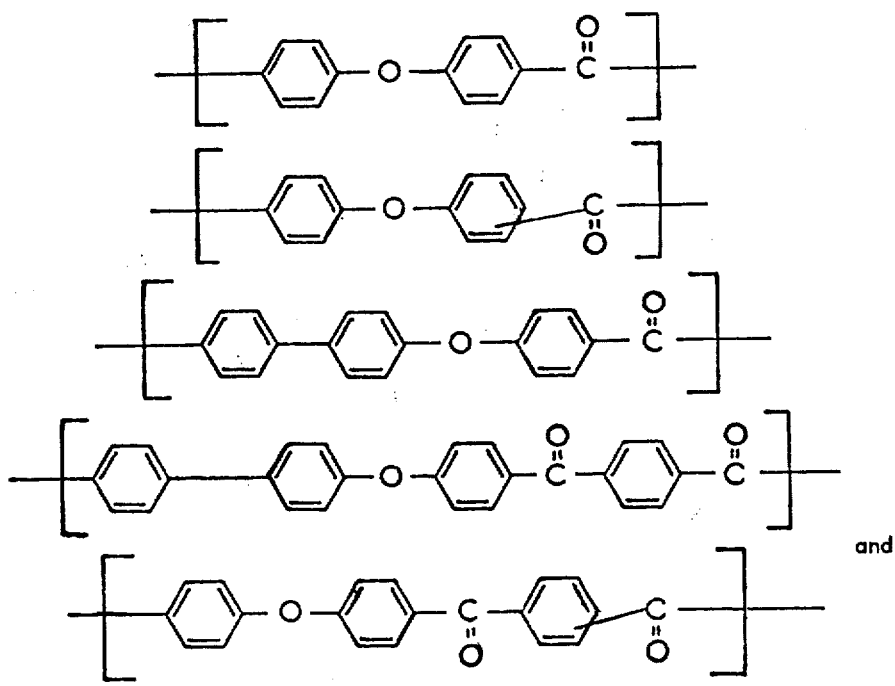

and

The synthesis of these and related polyarylether ketones are described in U.S. Pat. Nos. 3,085,205, 3,442,857, 3,441,538 and 3,668,057, German Offenlegungsschrift 2,206,836 and J.Poly.Sci., 55,741 (1961). The teaching of these references is incorporated herein by reference to avoid unnecessary enlargement of the present specification.

SUMMARY OF THE INVENTION

It is an objective of the present invention to provide an oxidation stabilizer which is effective in polyarylether ketones at temperatures as high as 400°C or even more.

It is a further objective of this invention to provide an antioxidant for such polymers which is effective in relatively low concentrations and which does not adversely affect other polymer properties such as, for example, tensile strength, modulus and elongation. The manner of obtaining these and other objectives will be made apparent from the detailed description of the invention which follows.

Most of the commonly used prior art polymers have relatively low melting temperatures and hence can be processed at relatively low temperatures and perforce can also only be used in service at relatively low temperatures. A comparatively wide variety of antioxidants have been found effective in such low melting polymers. However, in the case of higher melting polymers such as the polyarylether ketones the processing temperatures must perforce be above even the comparatively high melting point of the polymer and likewise this high melting point encourages use of the polymer under circumstances where it will be exposed at least temporarily to high temperatures. Very few antioxidants have been found which are effective in organic substances at temperatures approaching or exceeding the melting point of the polyarylether ketones. No antioxidants are reported in the art for polyarylether ketones.

It has now been found in accordance with the instant invention that the incorporation of certain amphoteric metal oxides or mixture of amphoteric metal oxides into a polyarylether ketone substantially enhances the high temperature oxidative stability thereof. This discovery is altogether unexpected since metal oxides would if anything be expected to function as oxidation catalysts for organic substances including polymers. We have found acidic or basic oxides and indeed even certain oxides which have at least a partially amphoteric character to either have no significant effect on oxidation or be oxidation catalysts in polyarylether ketones. Furthermore, we have not found the amphoteric oxides of the present invention to have any reported antioxidant effect in polymers other than polyarylether ketones.

Unlike many antioxidants, the amphoteric oxides of the present invention are effective antioxidants for the polyarylether ketones when the latter are in both the molten and the solid state. The former effect is important since the most convenient way of forming plastic articles frequently involves an extrusion or molding process during which the polymer is retained in the molten state exposed to atmospheric oxygen, sometimes for prolonged periods. Likewise, in actual use polymers are frequently exposed to high temperatures only slightly below the polymer melting point in an oxygen-containing atmosphere (generally air) either for extended periods or on repeated occasions.

The term amphoteric metal oxide connotes metal oxides which are soluble in either acidic or basic aqueous solution but which are only sparingly soluble in pure water and to the extent that they do dissolve, form an essentially neutral solution.

Suitable amphoteric metal oxides are those of the metals aluminum, beryllium, bismuth, cadmium, cerium, gallium, germanium, lanthanum, lead, manganese, tin, titanium, zinc, zirconium and uranium. Preferred are the oxides of the metals aluminum, beryllium, cadmium, gallium, lead, manganese, tin, titanium, zinc and zirconium. Most preferred are the oxides of the metals aluminum, beryllium, manganese, lead, tin and zinc. Also suitable are other compounds of these metals which at the polymer processing temperature will decompose in situ to afford one of the above-indicated oxides such as, for example, the carbonates, hydroxides or alkoxides. The term amphoteric oxide as used hereinafter is meant therefore to connote either the aforementioned metal oxides per se or those compounds which will decompose to form the oxide when heated to a temperature at or below the polymer melting point.

In addition to the discovery that only the aforementioned amphoteric metal oxides are effective antioxidants for the polyphenylether ketones it has also been found that to be effective the amphoteric oxide must either be a hydrated oxide or if not hydrated must not be the surface inactive form of the oxide which results from high temperature calcining. For example, aluminum oxide, $Al_2O_3$, can exist in the form of three hydrates: a single mono hydrate and two different tri-hydrates. Non-hydrated alumina exists in the crystalline forms known as alpha, beta and gamma-alumina. All three hydrates are active antioxidants. Gamma-alumina is also an active antioxidant. However, alpha-alumina, which is the crystalline form of alumina into which gamma-alumina is transformed by calcining at a high temperature (ca. 800°C), is substantially ineffective. Likewise, beta-alumina, which is similar to alpha-alumina, is also substantially inactive. Non-hydrated titanium dioxide exists in three crystalline forms: rutile, anatase and brookite. The naturally occurring equivalent of rutile is known as ilmenite. The other crystalline forms of $TiO_2$ are transformed into rutile on calcining. The titanium dioxide pigment utilized in coloring polymers white is usually an airfloated ilmenite. Neither ilmenite nor rutile has been found to be an effective antioxidant, in contradistinction to brookite, anatase, the titanium dioxide hydrates or $Ti(OH)_4$ (which generates $TiO_2$ in situ by decomposing in the molten polymer) all of which are effective antioxidants.

This same critical distinction has been observed in the case of the other metal oxides of the present invention. High temperature calcining affords an essentially inactive material. Likewise, if a compound which decomposes on heating to form the oxide is heated to a temperature sufficient to effect said decomposition and then heated further up to about 800°C, the resulting oxide is essentially inactive.

A preferred concentration range for the amphoteric metal oxide in the polyarylene ether ketone is from about 0.1 to 12.0 weight percent. Amounts less than 0.1 weight percent do not produce sufficiently significant enhancement in oxidative stability to be fully effective under all circumstances. Above about 12 percent, although no deleterious effect is noted, little significant further enhancement of oxidation resistance occurs. In fact, in many instances, little practically useful enhancement occurs above about 5.0 weight percent. The preferred concentration of amphoteric oxide therefore ranges from about 0.5 weight percent to about 5.0 weight percent. Mixtures of any of the above-enumerated amphoteric oxides can also be used.

Although the particle size of the metal oxide is not critical it is preferably as finely comminuted as possible, preferably less than 1 micron, most preferably less than 0.1 micron.

The manner of incorporating the metal oxide into the polyarylether ketone may be any of the conventional procedures known for adding finely particulate inorganic compounds to polymers such as Henscheling, roll milling, Banbury mixing, extrusion and the like.

There can also be advantageously incorporated without adverse effect into the polyarylether ketones in addition to the metal oxides of the present invention other additives such as, for example, pigments, monomeric or polymeric extrusion aides, other polymers, flame retardants, co-antioxidants, U.V. stabilizers, brighteners, inert fillers, and the like.

The following examples illustrate certain embodiments of the invention to facilitate an understanding thereof. The scope of the invention disclosed herein is limited only by the appended claims.

EXAMPLE 1

The effectiveness of a variety of metal oxides as oxidation inhibitors for the polyarylether ketone of the structure

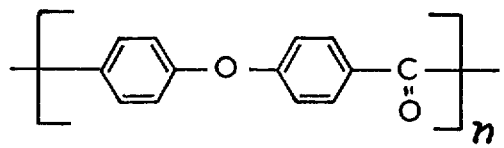

is demonstrated by the following test. The polymer, in particulate form, is admixed with 2.0 weight percent of metal oxide in powder form by rapidly charging 60 parts polymer and 1.2 parts metal oxide to a Brabender Plasticorder equipped with roller blades and a thermostated mixing head maintained at 400°C. Charging is effected as rapidly as possible (about 3 minutes) with the roller blades being rotated at 30 rpm. After addition is complete, the roller blade speed is increased to 100 rpm. The torque required to maintain the roller blade speed at 100 rpm is measured over a 30 minute period. If the polymer is undergoing oxidative attack, the torque required to maintain a constant 100 rpm will increase steadily, the greater the oxidation, the greater the increase in the torque required. Such torque increase is an excellent indication of thermally induced oxidation which, in polymers of the aryl polyether ketone type, is generally manifested by crosslinking which in turn results in a viscosity increase for the polymer. The greater the polymer viscosity, the greater the torque required to maintain a constant blade speed. The rate of torque increase for a sample containing no metal oxide is considered to have a value of 1.0. The rates for other samples containing 2.0 weight percent metal oxide are expressed relative to the value of 1.0 taken as standard for an oxide free sample. Samples undergoing a more rapid crosslinking than the standard will have values greater than 1.0. Conversely, the less the crosslinking the less the rate relative to the standard. Results are tabulated below in Table 1.

TABLE 1

| Metal Oxide | Relative of Torque Increase |
| --- | --- |
| None | 1.0 |
| $\alpha$-$Al_2O_3$ | 1.0 |
| $\beta$-$Al_2O_3$ | 1.0 |
| $\gamma$-$Al_2O_3$ | 0.3 |
| $Al_2O_3.H_2O$ | 0.4 |
| $Al_2O_3.3H_2O$(bayerite) | 0.3 |
| AlO(OH)Boehmite | 0.4 |
| $Al(OH)_3$ | 0.3 |
| basic beryllium carbonate | 0.4 |
| $Be_2(OH)_2CO_3$ | |
| beryllium oxide hydrate | 0.3 |
| $BeO.XH_2O$ | |
| beryllium oxide (calcined) | 1.1 |
| bismuth oxycarbonate | 0.7 |
| $Bi_2O_2CO_3$ | |
| $Bi(OH)_3$ | 0.8 |
| $Bi_2O_4.2H_2O$ | 0.6 |
| $Bi_2O_3$ | 0.8 |
| $CdCO_3$ | 0.6 |
| $Cd(OH)_2$ | 0.5 |
| $Ce_2(CO_3)_3.5H_2$) | 0.7 |
| $CeO_2.XH_2O$ | 0.8 |
| $Ga(OH)_3$ | 0.4 |
| $Ga_2O_3$ ($\alpha$-form) | 0.3 |
| $Ga_2O_3$ ($\beta$-form) | 0.3 |
| $GeO_2$ (hexagonal) | 0.8 |
| $La_2(CO_3)_3.XH_2O$ | 0.8 |
| $La(OH)_3$ | 0.8 |
| $La_2O_3$ | 0.9 |
| $PbO_2$ | 0.4 |
| $MnO(OH)_2$ | 0.4 |
| $MnO_2$ | 0.5 |
| $SnO_2$ | 0.8 |
| $SnO_2$(calcined at 800°C) | 1.0 |
| SnO | 0.5 |
| $TiO_2$ (anatase) | 0.8 |
| $TiO_2$ (brookite) | 0.8 |
| $Ti(OH)_4$ | 0.5 |
| $TiO_2.H_2O$ | 0.7 |
| $TiO_2$ (rutile) | 1.1 |
| $TiO_2$ (ilmenite) | 1.0 |
| $UO_2$ | 0.8 |
| $UO_2CO_3.2Na_2CO_3$ | 5.0 |
| $ZnCO_3$ | 0.6 |
| $Zn(OH)_2$ | 0.5 |
| ZnO | 0.8 |
| $3ZrO_2CO_2.H_2O$ | 0.8 |
| $ZrO_2.XH_2O$ | 0.8 |
| aluminium tri-isopropoxide | 0.4 |
| aluminum tri-methoxide | 0.4 |
| beryllium diethoxide | 0.7 |
| titanium tetramethoxide | 0.6 |
| tin tetraethoxide | 0.5 |
| $\gamma$-$Al_2O_3$ + beryllium oxide hydrate (1.0 wt. % of each) | 0.3 |
| $MnO_2$ + ZnO (1.0 wt. % of each) | 0.7 |
| $PbO_2$ + $\gamma$-$Al_2O_3$ (1.0 wt. % of each) | 0.4 |
| $SnO_2$ + $Zn(OH)_2$ (1.0 wt. % of each) | 0.5 |

These results indicate that the disclosed metal oxides, and compounds which can decompose in situ to form such oxides, are effective oxidation inhibitors. However, as is also apparent, when the surface inactive (calcined) form of the oxide is used it is substantially ineffective at inhibiting oxidation. $UO_2CO_3.2Na_2CO_3$ is probably a pro-oxidant because of the presence of basic sodium carbonate.

EXAMPLE 2

The oxides and hydroxides of a number of other metals were tested utilizing the same procedure as described in EXAMPLE 1. The results are tabulated below and indicate that other metal oxides are either substantially ineffective or actually function as pro-oxidants.

TABLE 1

| Metal Oxide | Relative Rate of Torque Increase |
| --- | --- |
| $Sb_2O_5$ | 2.0 |
| $Sb_2O_3$ | 1.4 |
| $BaCO_3$(witherite) | 5.0 |
| $BaO_2$ | 4.0 |
| $Bi_2O_2CO_3$ | 1.1 |
| $Bi_2O_4.2H_2O$ | 1.0 |
| $CuCO_3.Cu(OH)_2$ (malachite) | 5.0 |
| $Cu(OH)_2$ | 5.0 |
| CuO (tenorite) | 5.0 |
| $Cr(OH)_3$ | 1.0 |
| $CrO_2$ | 1.0 |
| $Cr_2O_3$ | 1.0 |
| $FeCO_3.H_2O$ | 1.0 |
| FeO(OH) | 1.0 |
| FeO | 1.0 |
| $Fe_2O_3$ | 1.0 |
| $MgCO_3.3H_2O$ | 1.5 |
| $Mg(OH)_2$ | 1.5 |
| MgO | 1.2 |
| $Hg_2O$ | 1.5 |
| HgO | 1.8 |
| $SiO_2$ (powdered quartz) | 1.0 |
| $SiO_2$ (silica gel) | 1.0 |

EXAMPLE 3

The effect of varying the concentration of metal oxide on torque increase was examined in a series of runs. The experimental procedure is the same as that reported in Example 1 except that the weight percent of metal oxide added to the polymer is varied. Results are tabulated below.

TABLE 1

| Metal Oxide | Weight Percent | Relative Rate of Torque Increase |
| --- | --- | --- |
| None | 0 | 1.0 |
| $\gamma$-alumina | 0.1 | 0.96 |
| " | 0.2 | 0.94 |
| " | 0.5 | 0.71 |
| " | 2.0 | 0.38 |
| " | 5.0 | 0.25 |
| " | 10.0 | 0.16 |
| " | 12.0 | 0.12 |
| " | 15.0 | 0.11 |
| $PbO_2$ | 0.1 | 0.95 |
| " | 0.2 | 0.93 |
| " | 0.5 | 0.65 |
| " | 2.0 | 0.30 |
| " | 5.0 | 0.20 |
| " | 10.0 | 0.10 |
| " | 15.0 | 0.10 |
| $Zn(OH)_2$ | 0.1 | 0.98 |
| " | 0.5 | 0.96 |
| " | 2.0 | 0.50 |
| " | 5.0 | 0.30 |
| " | 10.0 | 0.22 |
| " | 15.0 | 0.20 |

The results shown above indicate that as little as 0.1 weight percent metal oxide has some inhibitory effect and that above about 10 to 12 weight percent, depending upon the particular oxide chosen, there is little further improvement in inhibition.

The polymer (polydiphenylether ketone) utilized in Examples 1–3 is prepared in accordance with the method reported in U.S. Pat. Nos. 3,442,857 and 3,441,538.

EXAMPLE 4

The effectiveness of certain of the preferred metal oxides at inhibiting oxidative degradation of polyarylether ketones other than the polymer utilized in Examples 1–3 can be determined using the same test procedure. In all cases 2.0 weight percent oxide is utilized. Results are tabulated below.

TABLE 1

| Run No. | Metal Oxide | Relative Rate of Torque Increase |
|---|---|---|
| 1 | None | 1.0 |
| 2 | γ-alumina | 0.4 |
| 3 | beryllium oxide hydrate | 0.4 |
| 4 | PbO$_2$ | 0.5 |
| 5 | γ-alumina | 0.5 |
| 6 | beryllium oxide hydrate | 0.5 |
| 7 | PbO$_2$ | 0.6 |
| 8 | None | 1.0 |
| 9 | None | 1.0 |
| 10 | γ-alumina | 0.4 |
| 11 | beryllium oxide hydrate | 0.5 |
| 12 | PbO$_2$ | 0.5 |

Runs 1 - 4 are for the polymer

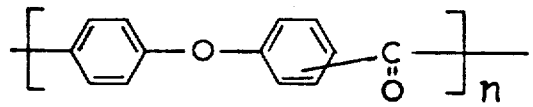

The representation

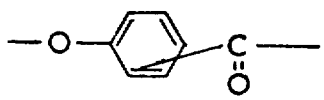

indicates that the relationship of the —O— and

substituents on the phenyl ring can be either meta or para, randomly along the polymer chain as opposed to the exclusively para linkage of the polymer of Examples 1 - 3. The polymer of Runs 1–4 of this Example is prepared in accordance with the method reported in U.S. Pat. Nos. 3,442,857 and 3,441,538. It has a para/meta ratio of 4:1.

Runs 5 - 8 are for the copolymer

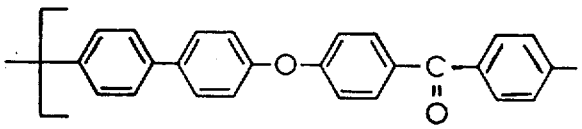

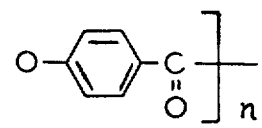

This polymer is prepared in accordance with the method reported in German Offenlegungsschrift No. 2,206,836 and pending U.S. application Ser. No. 115,824 filed Dec. 16, 1971. For this polymer, torque increase was measured at 450°C and mixing carried out at 450°C.

Runs 9 - 12 are for the polymer

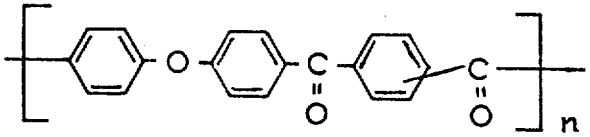

Again the representation

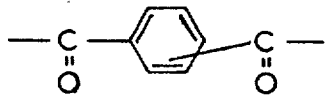

connotes that the two

substituents pendant on the same phenyl ring can be in either the meta or para relationship to each other randomly along the polymer chain. The preparation of this polymer is effected in accordance with the teaching of U.S. Pat. No. 3,668,057. It has a para/meta ratio of 7:3.

As is apparent from the results above, the metal oxides of the present invention are also effective oxidation inhibitors for other aryl polyether ketones. It should be noted that the relative rate of torque increase of 1.0 for each of the runs utilizing polymer containing no metal oxide is for the comparison with other samples of the same polymer containing metal oxide and does not signify that the rate of torque increase is the same for all of the polymers.

EXAMPLE 5

Rather surprisingly, the oxides of the present invention have also been found to significantly improve the resistance to environmental stress corrosion of polyarylether ketones when added in amounts effective to impart oxidation resistance. A 24 gauge (AWG) silver plated copper single strand conductor was insulated with a 5 mil thick extruded jacket of polydiphenylether ketone polymer (the polymer of Examples 1–3) containing either no additive or 2.0 weight percent metal oxide. Samples of wire approximately 16 inches long were then twisted into the configuration of a Hangman's Noose and immersed in xylene at 25°C for 24 hours. The samples were then dried and tested to determine the dielectric breakdown voltage in accordance with the test method of specification MIL-W-81044A. After immersion, the samples containing metal oxide had a significantly higher breakdown voltage than the standard oxide free sample. This is particularly surprising in view of the fact that without immersion the metal oxide containing samples exhibited lower breakdown voltages than the oxide free sample. Results are tabulated below.

TABLE 1

| Metal Oxide, 2 weight percent | Breakdown voltage (KV) after 24 hr. xylene immersion |
|---|---|
| None (standard) | 6.9 |
| $\gamma$-$Al_2O_3$ | 13.4 |
| $Al_2O_3 \cdot H_2O$ | 13.0 |
| BeO | 9.9 |
| $MnO_2$ | 10.1 |
| $PbO_2$ | 11.4 |
| $SnO_2$ | 9.5 |
| $ZnCO_3$ | 10.8 |

The breakdown voltage, without immersion, of the standard sample is 14.6 KV.

EXAMPLE 6

The addition of the metal oxide of the present invention to polyarylether ketones has no significant adverse effect on the physical properties of the polymer. The ultimate elongation and tensile strength of the polymer of Examples 1–3 was determined in accordance with ASTM Method D 638 for oxide free samples and for samples containing 2.0 weight percent metal oxide. Polymer samples containing 2.0 weight percent of the following oxides were tested; gamma $Al_2O_3$, beryllium oxide, manganese dioxide, stannous oxide, lead dioxide and zinc hydroxide. In all instances there was no significant change in these two properties on addition of 2.0 percent oxide.

EXAMPLE 7

Samples of the wire utilized in Example 5 were used to demonstrate the effectiveness of the metal oxides of the present invention at inhibiting thermooxidatively induced crosslinking of polyarylether ketones in the solid state. Samples of the wire were suspended vertically in an air circulating oven maintained at 280°C for 23 days. Periodically, wire samples were removed, the polyarylether ketone insulation stripped off and the inherent viscosity thereof determined. All viscosities were determined in concentrated $H_2SO_4$ at 25°C at a concentration of 0.1 g/100 ml.

Results are tabulated below.

Sample 1 is polydiphenylether ketone containing no metal oxide. Samples 2–7 are the same polymer containing 2 percent metal oxide as follows.

| Sample | Metal Oxide |
|---|---|
| 2 | $\gamma$-alumina |
| 3 | beryllium oxide hydrate |
| 4 | manganese dioxide |
| 5 | stannous oxide |
| 6 | lead dioxide |
| 7 | zinc hydroxide |

As is apparent, all of the metal oxides are effective at significantly reducing the viscosity increase caused by high temperature oxidation in the solid state.

We claim:

1. A composition comprising a polyarylether ketone and an effective antioxidant amount of metal oxide selected from the group consisting of the amphoteric metal oxides of aluminum, beryllium, bismuth, cadmium, cerium, gallium, germanium, lanthanum, lead, manganese, tin, titanium, zinc, zirconium, uranium, and mixtures thereof.

2. A composition in accordance with claim 1 wherein said amphoteric metal oxide is present in an amount ranging from about 0.1 weight percent up to about 12.0 weight percent.

3. A composition in accordance with claim 2 wherein said amphoteric metal oxide is selected from the oxides of the metals aluminum, beryllium, cadmium, gallium, lead, manganese, tin, titanium, zinc, zirconium and mixtures thereof.

4. A composition in accordance with claim 3 wherein said amphoteric metal oxide is selected from the oxides amphoteric metal of the metals aluminum, beryllium, manganese, lead, tin, zinc and mixtures thereof.

5. A composition in accordance with claim 4 wherein said amphoteric metal oxide is gamma aluminum oxide.

6. A composition in accordance with claim 2 wherein said polyarylether ketone is selected from the group of polyarylether ketones, having recurring units of the structure:

TABLE 1

| Time in Days | Sample 1 | 2 | 3 | 4 | 5 | 6 | 7 |
|---|---|---|---|---|---|---|---|
| 0 | 1.31 | 1.31 | 1.31 | 1.31 | 1.30 | 1.30 | 1.30 |
| 1 | 1.31 | 1.31 | 1.32 | 1.29 | 1.31 | 1.30 | 1.29 |
| 2 | 1.31 | 1.28 | 1.30 | 1.29 | 1.33 | 1.33 | 1.32 |
| 3 | 1.34 | 1.29 | 1.30 | 1.34 | 1.35 | 1.35 | 1.35 |
| 5 | 1.41 | 1.31 | 1.30 | 1.33 | 1.38 | 1.38 | 1.38 |
| 7 | 1.53 | 1.37 | 1.32 | 1.38 | 1.42 | 1.41 | 1.40 |
| 11 | 1.77 | 1.38 | 1.38 | 1.42 | 1.48 | 1.49 | 1.45 |
| 13 | gellation | 1.46 | 1.45 | 1.45 | 1.50 | 1.52 | 1.50 |
| 14 | | 1.50 | 1.52 | 1.55 | 1.50 | 1.57 | 1.56 |
| 15 | | 1.57 | 1.60 | 1.62 | 1.53 | 1.65 | 1.60 |
| 16 | | 1.54 | 1.60 | 1.65 | 1.50 | 1.70 | 1.67 |
| 18 | | 1.73 | 1.65 | 1.68 | 1.68 | 1.73 | 1.70 |
| 21 | | 1.74 | 1.75 | 1.78 | 1.80 | 1.80 | 1.75 |
| 23 | | 1.75 | 1.78 | 1.82 | 1.78 | 1.85 | 1.80 |